United States Patent [19]
Kanao

[11] Patent Number: 5,316,047
[45] Date of Patent: May 31, 1994

[54] PRESSURE-RESISTANT HELICAL CORRUGATED PIPE

[76] Inventor: Shiro Kanao, No. 9-18, Nanpeidai 4-chome, Takatsuki-shi, Osaka, Japan

[21] Appl. No.: 807,649

[22] Filed: Dec. 16, 1991

Related U.S. Application Data

[63] Continuation of Ser. No. 439,963, Nov. 21, 1989, abandoned.

[30] Foreign Application Priority Data

Dec. 27, 1988 [JP] Japan .................. 63-333131

[51] Int. Cl.⁵ .................. F16L 9/16; F16L 11/11
[52] U.S. Cl. .................. 138/173; 138/121; 138/138
[58] Field of Search .......... 138/172, 173, 174, 175, 138/176, 154, 122, 129, 132, 133, 134, 121, 138

[56] References Cited

U.S. PATENT DOCUMENTS

| | | | |
|---|---|---|---|
| 4,303,104 | 12/1981 | Hegler et al. | 138/121 |
| 4,487,232 | 12/1984 | Kanao | 138/173 |
| 4,523,613 | 6/1985 | Fouss et al. | 138/121 |
| 4,624,603 | 11/1986 | Kanao | 138/154 X |
| 4,657,049 | 4/1987 | Fourty et al. | 138/154 X |
| 4,759,389 | 7/1988 | Woo Suck | 138/154 |
| 4,796,672 | 1/1989 | Kanao | 138/154 |
| 4,824,502 | 4/1989 | Nagayoshi et al. | 138/154 X |
| 4,860,797 | 8/1989 | Richards et al. | 138/154 X |
| 4,862,924 | 9/1989 | Kanao | 138/154 X |
| 5,007,462 | 4/1991 | Kanao | 138/154 |

FOREIGN PATENT DOCUMENTS

| | | | |
|---|---|---|---|
| 0246360 | 11/1987 | European Pat. Off. . | |
| 2906145 | 8/1979 | Fed. Rep. of Germany | 138/174 |
| 141889 | 9/1986 | Japan . | |
| 143884 | 9/1987 | Japan . | |
| 3329 | of 1886 | United Kingdom | 138/173 |
| 5878 | of 1900 | United Kingdom | 138/173 |
| 754491 | 8/1956 | United Kingdom | 138/174 |
| 2184193 | 6/1987 | United Kingdom . | |

*Primary Examiner*—Stuart S. Levy
*Assistant Examiner*—Kevin M. Watkins
*Attorney, Agent, or Firm*—Sughrue, Mion, Zinn, Macpeak & Seas

[57] ABSTRACT

A pressure-resistant helical corrugated pipe comprises a helical corrugated pipe wall formed by a top portion, opposite side wall portions and a bottom portion; and a continuous thin metal belt plate disposed at least in the top portion or the bottom portion and also in part or the whole of the opposite side wall portions. The metal belt plate serves as a constituent element for the pipe wall. A portion of the metal belt plate disposed at the top portion or the bottom portion has one or more reinforcement ribs and a connective portion for the metal belt plate is integrally formed of a synthetic resin material or rubber material.

8 Claims, 3 Drawing Sheets

PRESSURE-RESISTANT HELICAL CORRUGATED PIPE

This is a Continuation of application Ser. No. 07/439,963 filed Nov. 21, 1989, now abandoned.

BACKGROUND OF THE INVENTION

The present invention relates to a pressure-resistant helical corrugated pipe mainly adapted to be buried in the ground, so that telecommunication cables such as an electric cable and a telephone cable can be installed in such a corrugated pipe for the purpose of protecting such cables. Also, such a corrugated pipe is used as a water main pipe, a sewer pipe, or a liquid transport pipe used in a plant or a factory.

Among such conventional pressure-resistant helical corrugated pipes, the type of corrugated pipes adapted for underground use have been required to be pressure-resistant in order to withstand a great ground pressure. In a conventional underground pressure-resistant pipe (see, for example, Japanese Laid-Open Utility Model Application No. 141889/86 filed by the Applicant of the present application), a continuous reinforcing belt plate made of a thin metal plate is embedded in the pipe wall and extends over the top portion of the helical corrugation, the opposite side wall portions, extending from the top portion, and part of the bottom portion.

When the metal reinforcing belt plate to be thus embedded in the pipe wall is of such a unitary configuration that this reinforcing belt plate is disposed in the top portion and opposite side wall portions of the corrugated pipe wall, with its oppositely-projecting side edge portions disposed in part of the bottom portion as described above, the pipe is excellent in pressure-resistant strength to withstand a flattening force.

Despite this, the present invention seeks to provide a pipe of the type in which a belt plate of a thin metal plate is embedded in a pipe wall to increase its pressure-resistant strength to withstand the flattening (in some cases, the metal belt plate is exposed at the surface of the pipe wall), and the pipe has a further increased pressure-resistant strength to withstand the flattening even if the belt plate material of the thin metal plate has an equal thickness, and the amount of covering synthetic resin material used in the above prior art pipe is reduced to decrease the overall weight of the pipe.

SUMMARY OF THE INVENTION

According to the present invention, there is provided a pressure-resistant helical corrugated pipe having a helical corrugated pipe wall wherein the corrugation of the pipe wall is formed by a top portion, opposite side wall portions extending from the top portion and a bottom portion disposed close to the axis of the pipe; a continuous belt plate in the form of a thin metal plate of either a generally U-shaped transverse cross-section or a generally inverted U-shaped transverse cross-section is disposed at least in the top portion or the bottom portion and also in part or the whole of the opposite side wall portions extending therefrom, the metal belt plate serving as a constituent element for the pipe wall; that portion of the metal belt plate disposed at the top portion or the bottom portion has one or more reinforcement ribs; and a connective portion for the metal belt plate is integrally formed of a synthetic resin material or a rubber material.

When the pipe of this construction is, for example, to be buried in the ground, the pipe is installed along a groove dug in the ground at a required depth at the installation site, as is the case with the prior art. When this pipe is used as a protective pipe for a cable, an electric cable or a telephone cable is passed through the pipe using a leading wire, and then the dug soil is applied to the pipe from above to cover it. In this manner, a pipe having an excellent pressure resistance is installed at the installation site.

BRIEF DESCRIPTION OF THE DRAWINGS

FIG. 1 is a partly-broken, front-elevational view of a pipe; FIG. 2 is a longitudinal cross-sectional view of a main portion of the pipe; FIG. 3 is an exploded, cross-sectional view of the main portion;

DETAILED DESCRIPTION OF THE PREFERRED EMBODIMENT

Preferred embodiments of the present invention will now be described with reference to the drawings.

Figure 1:
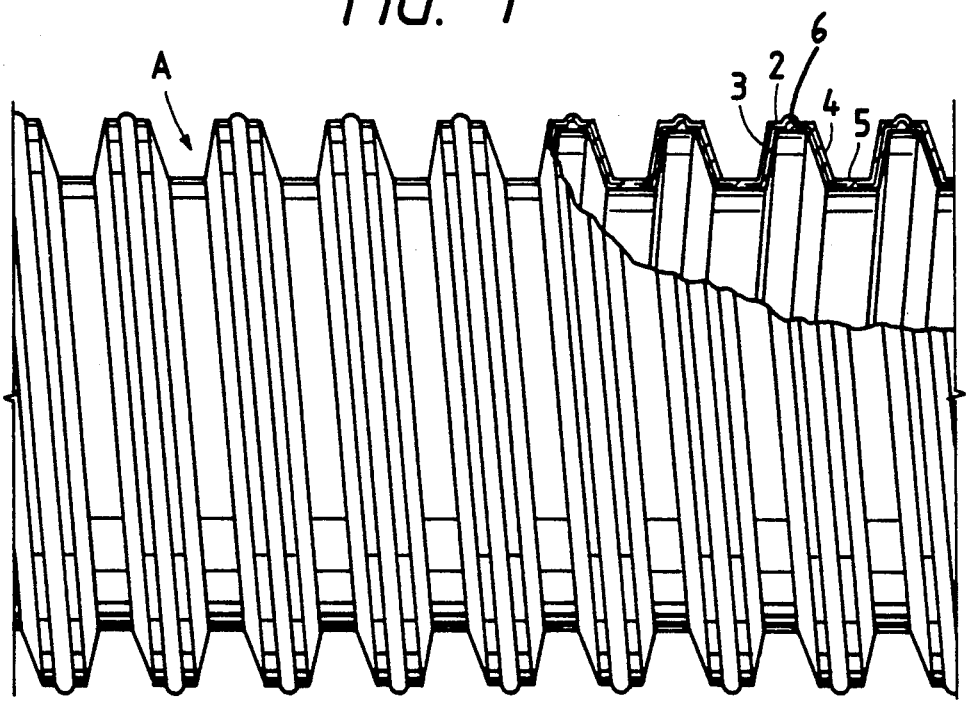
FIGS. 1 to 3 are illustrative of a first embodiment of the present invention.
Figure 2:
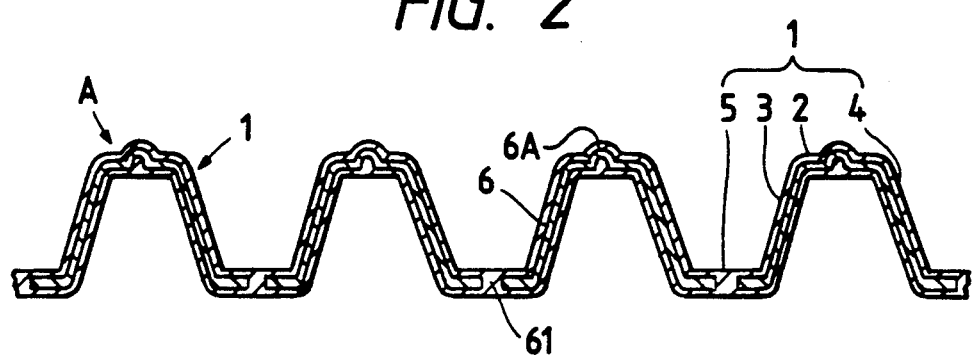
Figure 3:
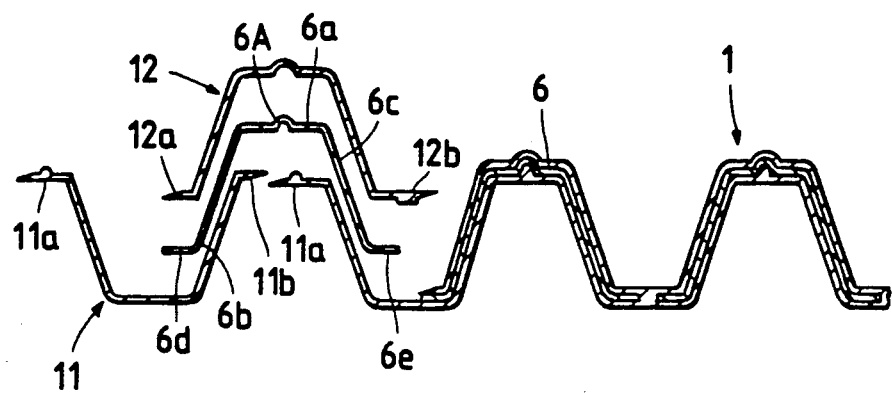

FIGS. 1 to 3 show one preferred embodiment (hereinafter referred to as "first embodiment") of the present invention. A helical corrugated pipe A shown in FIG. 1 has a pipe wall 1 having the cross-section of a trapezoidal corrugation like a generally V-shape. As shown in FIG. 3, there is employed a belt plate 6 of steel having a generally inverted U-shaped cross-section which is defined by a central portion 6a (corresponding to the short side of the trapezoid), opposite inclined sides 6b and 6c extending therefrom, and opposite horizontal side edge portions 6d and 6e formed by bending the lower ends of the inclined side portions 6b and 6c laterally and outwardly. Further, a convex reinforcement rib 6A is formed on the central portion 6a centrally of the width thereof. A belt member 11 of a synthetic resin has an upwardly-open inverted trapezoidal cross-section with its upper ends horizontally projected laterally and outwardly (hereinafter referred to merely as "inverted trapezoidal shape"). The belt member 11 is helically wound step by step, with its horizontal projecting ends 11a and 11b overlapping each other, and the overlapped portions are fused together, thereby forming an inner resin wall of the pipe wall 1. Then, the metal belt plate 6 is helically wound in such a manner that the adjacent horizontal ends 6d and 6e are slightly spaced from each other at the central portion of a bottom portion 5 of the pipe wall 1. A synthetic resin belt member 12 of a trapezoidal cross-section, inverted with respect to the synthetic resin belt member 11, helically wound around the metal belt plate 6 in such a manner that its opposite horizontal ends 12a and 12b overlap each other and are fused together, thereby forming an outer synthetic resin wall of the pipe wall 1. The metal belt plate 6 is disposed in and is integrally bonded to the synthetic resin material of the inner and outer resin belt member 11 and 12 by fusing these belt members 11 and 12, thereby providing the helical corrugated pipe construction shown in FIG. 2.

Thus, the metal belt plate 6 is disposed in a top portion 2 and opposite side wall portions 3 and 4 of the pipe wall 1, and a connective portion 61 made solely of the synthetic resin is provided at the central portion of the bottom portion 5, the metal belt plate 6 being absent in the connective portion 61. The convex reinforcement rib 6A is provided at the central portion of the top portion 2.

Figure 4:
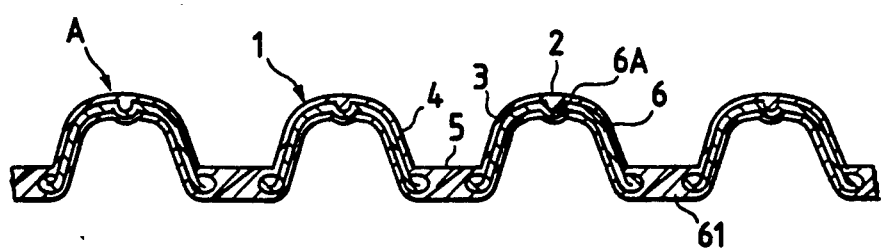
FIGS. 4 and 5 are a longitudinal cross-sectional view and an exploded view of a main portion of another embodiment of the invention, respectively.
Figure 5:
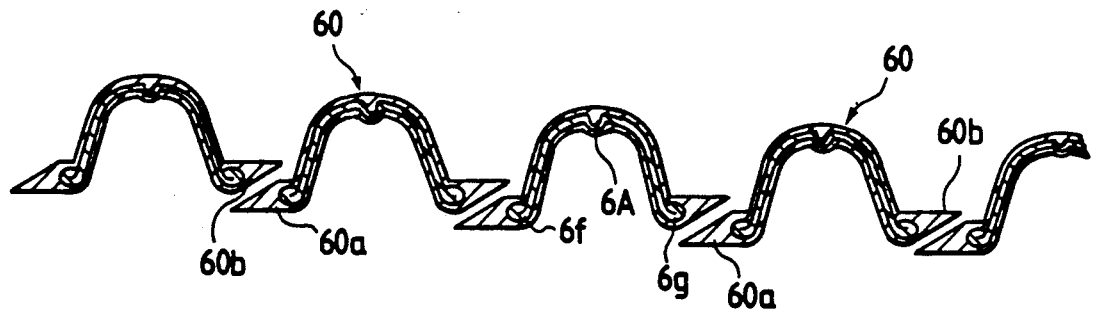

In an embodiment of the invention shown in FIGS. 4 and 5, a top wall 2 of a pipe wall 1 has a smoothly arcuate corrugated cross-section, and the helical corrugated pipe A of this embodiment is formed by a method different from that of the above first embodiment.

In this embodiment, as shown in FIG. 5, a metal belt plate 6 has a downwardly-open inverted U-shaped cross-section that is a smoothly arcuate cross-section. A concave reinforcement rib 6A is formed at the central portion of the metal belt plate 6. The lower ends 6f and 6g are curled or folded. The metal belt plate 6 is made of stainless steel. The metal belt plate 6 is passed through a synthetic resin extruder (not shown), so that a synthetic resin material is fusingly bonded on the entire inner and outer peripheral surfaces thereof to form a molded belt member 60. The molded belt member 60 is helically wound step by step from the right in the drawings, and the right side edge portion 60b is held against its adjoining left side edge portion 60a of the preceding turn 60 in overlapping relation thereto, and the synthetic resin material of the thus overlapped portions are fused to be joined together, thereby forming the continuous helical corrugated pipe step by step, the resulting pipe having the concave reinforcement rib 6A disposed at the central portion of the top portion 2 of the pipe wall 1.

In this embodiment, before the helical winding, the synthetic resin material is beforehand fused and integrally bonded onto the metal belt plate 6, and thus the metal belt plate 6 is disposed in and covered by the synthetic resin material. A connective portion 61 for the metal belt plate 6 is made solely of the synthetic resin material, and therefore the metal belt plate 6 is absent in the connective portion 61, as shown in FIG. 4.

In this embodiment, although the pipe wall 1 is formed using only the resin molded belt member 60 formed by integrally molding the synthetic resin material over the entire inner and outer peripheral surfaces of the metal belt plate 6, the pipe wall 1 may be formed by first winding the inner synthetic resin belt member 11 to form the inner resin wall of the pipe wall 1 by fusion as in the first embodiment and then by winding the molded belt member 60 around this inner resin wall and fusing them to be integrally joined together. Further, an outer layer or wall of a synthetic resin may be formed on the outer periphery of such a construction to cover the same. Alternatively, without providing such an inner resin wall, only the outer resin layer may be formed on the molded belt member.

The material from which the metal belt plate 6 is made is not limited to a flat plate, and it can be made by a so-called perforated metal plate having a number of small perforations or punched holes formed therethrough. When synthetic resin layers are applied to such a metal plate having a number of small perforations, the synthetic resin layers on the opposite sides of the perforated metal plate flow through the perforations and are integrally joined together, so that the metal belt plate is firmly joined to the inner and outer resin layers. However, as described above in the above embodiments, the metal belt plate 6 used in the present invention is not necessarily limited to such a plate having the small perforations.

A method of manufacturing the resin molded belt member 60 is not limited to the above-mentioned method in which the synthetic resin is extruded from the die together with the metal belt plate 6 to cover the same. For example, there can be used a covering method in which the metal belt plate 6 is dipped in a molten synthetic resin, and also other coating and resin-application methods can be used.

Next, modifications of the helical corrugated pipe wall 1 and the metal belt plate 6 will now be described.

In the above two embodiments, although the helical corrugated shape of the pipe wall 1 is a trapezoidal corrugated cross-section or an arcuate corrugated cross-section, the pipe wall may have, for example, a channel-shaped corrugated configuration or a generally triangular corrugated shape, and in this case the cross-section of the metal belt plate 6 is conformed to the corrugated shape of the pipe wall 1.

Figure 6:
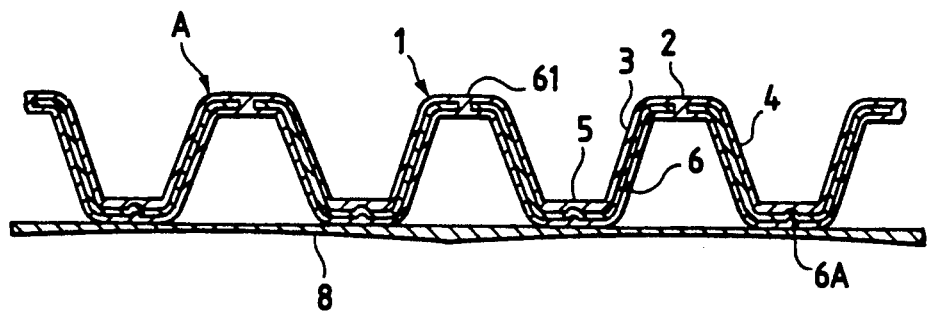
FIGS. 6 to 11 are longitudinal cross-sectional views of main portions of further embodiments of the invention, respectively.

In an embodiment of the invention shown in FIG. 6, a pipe wall 1 has a trapezoidal corrugated cross-section as in the first embodiment. A metal belt member 6 has a trapezoidal cross-section like a generally upwardly-open U-shape, and a convex reinforcement rib 6A is formed on the central portion of the bottom or base of the U-shaped belt member. The convex reinforcement rib 6A is disposed at the central portion of the bottom 5 of the pipe wall 1.

In this embodiment, an internal cylindrical wall 8 is provided inwardly of and formed integrally with the bottom portion 5 of the pipe wall 1 of the pipe A.

Figure 7:
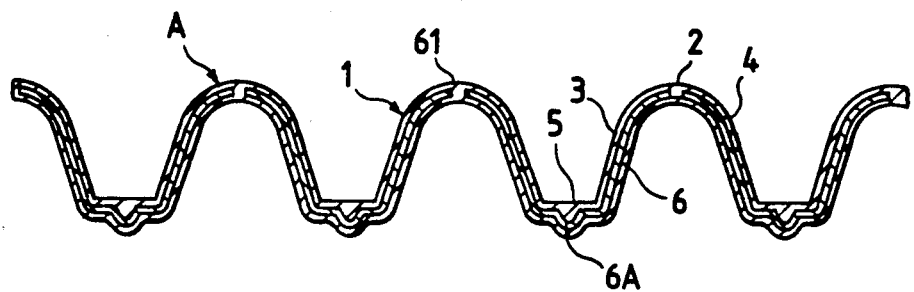

In an embodiment of the invention shown in FIG. 7, the helical corrugated shape of a pipe wall 1 is an arcuate corrugated cross-section as in the embodiment of FIG. 4. A metal belt plate 6 is of an upwardly-open trapezoidal cross-section with its upper left and right ends bent laterally, outwardly and arcuately. A concave reinforcement rib 6A is formed at the central portion of the bottom or base of the trapezoidal shape. The concave reinforcement rib 6A is disposed at the central portion of the bottom 5 of the pipe wall 1.

Figure 8:
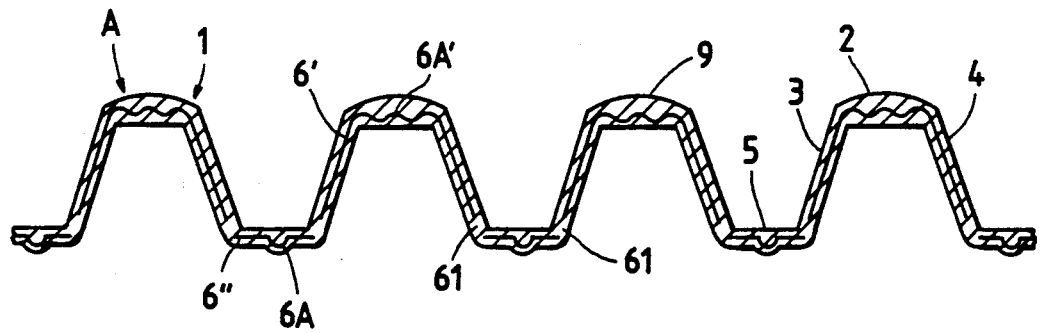

In an embodiment of the invention shown in FIG. 8, a metal belt plate embedded in a pipe wall 1 comprises two kinds of metal belt plates 6' and 6". The metal plate 6' is of an inverted U-shaped cross-section, and the base or bottom of the metal plate 6" has a small corrugation over the entire area thereof to provide a plurality of reinforcement ribs 6A' continuous with one another. The metal belt plate 6" is of a flat configuration having a concave reinforcement rib 6A formed at the central portion thereof. The inverted U-shaped metal belt plate 6' is disposed in the top portion 2 of the pipe wall 1 and the opposite side wall portions 3 and 4 thereof (extending from the top portion 2) except for the lower end portions of the opposite side wall portions 3 and 4. The flat metal belt plate 6" is disposed in the bottom portion 5 of the pipe wall 1. The two metal belt plates 6' and 6" are entirely covered by a covering material of a synthetic resin, and those portions of the opposite side wall portions 3 and 4 disposed adjacent to the bottom portion 5 respectively constitute connective portions 61 and 61 where the metal belt plates 6' and 6" are not present. The plurality of reinforcement ribs 6A' are provided at the top portion 2 of the pipe wall 1 over the entire width thereof, and the concave reinforcement rib 6A is provided at the central portion of the bottom portion 5 of the pipe wall 1.

Figure 9:
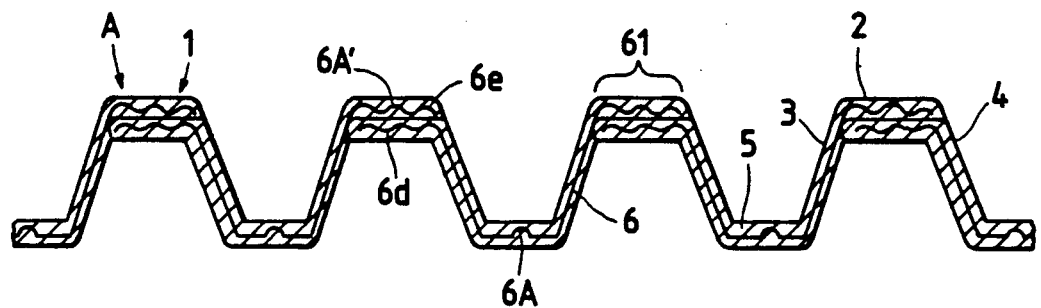

In an embodiment of the invention shown in FIG. 9, there is used a metal belt plate 6 of an upwardly-open trapezoidal cross-section like a U-shape whose upper end portions are directed laterally and outwardly to provide projections 6d and 6e. Each of the projections 6d and 6e has a small corrugation over the entire area thereof to provide a plurality of reinforcement ribs 6A'. The metal belt plate 6 has a convex reinforcement rib 6A at the central portion of the base or bottom thereof. The projections 6d and 6e overlap each other at the top portion 2 of the pipe wall 1 in the direction of the thickness of the pipe wall 1, and are connected together through a covering resin material. In this pipe construction, the entire inner and outer surfaces of the metal belt plate 6, including the inner and outer sides of the overlap connective portion 61, are covered by a covering material of synthetic resin.

The metal belt plate 6 in the present invention may comprises two kinds of metal plates 6' and 6" as in the embodiment of FIG. 8, and in this case the two belt plates are not always required to have the same size, shape and thickness, and these can be suitably determined.

With respect to the thickness of the resin or rubber constituting part of the pipe wall 1, a thickened covering resin portion 9, 10 may be formed at the outer side of the top wall 1 or the bottom portion 5 over either the entire width thereof or part of the width, as in the embodiment of FIG. 8 and an embodiment (later described) of FIG. 10.

In the case where such thickened resin portion is provided at the inner side of the bottom portion 5, even when wear develops due to the frictional contact of a cable or the like, the wear does not reach the metal belt plate 6, so that the metal belt plate 6 will not become bare, thus positively preventing the metal belt plate from being subjected to rust. In the case where such thickened resin portion is provided at the outer side of the top portion, even when the pipe is dragged at the time of installation thereof, and is brought into contact with a sharp corner of a stone or a rock so that the pipe is damaged, the metal belt plate 6, advantageously, will not be exposed immediately.

As described above for the embodiment of FIG. 6, if the cylindrical inner wall 8 made of flexible synthetic resin or rubber (or made of a rigid material if the pipe is not required to be flexible) is formed internally of the pipe 1, the pipe is suited for use as a water main pipe or a liquid transport pipe, since the liquid or the like offers less resistance.

The cylindrical inner wall 8, if necessary, may be reinforced by a reinforcement material such as a fibrous material (e.g., threads, fabric and non-woven fabric), a metal plate and a metal net. With this construction, the pipe can withstand a high internal pressure and can be used as a high-pressure transport pipe.

In the above embodiments, the pipes include the metal belt plate 6 which is covered with the covering or coating materials of a synthetic resin or the like over the entire inner and outer surfaces thereof. In other words, the pipes are of such a construction that the metal belt plate 6 is embedded in the pipe wall-forming material of a synthetic resin or the like. However, in the present invention, the metal belt plate 6 is not always required to be covered with a synthetic resin or the like over the entire peripheral surfaces thereof. In the case where the metal belt plate 6 is made of a rust-resistant material or a material which has been subjected to a rust-prevention treatment such for example as plating, electrophoretic deposition, metallic coating and resin baking finish, the pipe can be of such a construction that the metal belt plate 6 is partially exposed at the surface of the pipe wall, as in those embodiments mentioned below.

Figure 10:
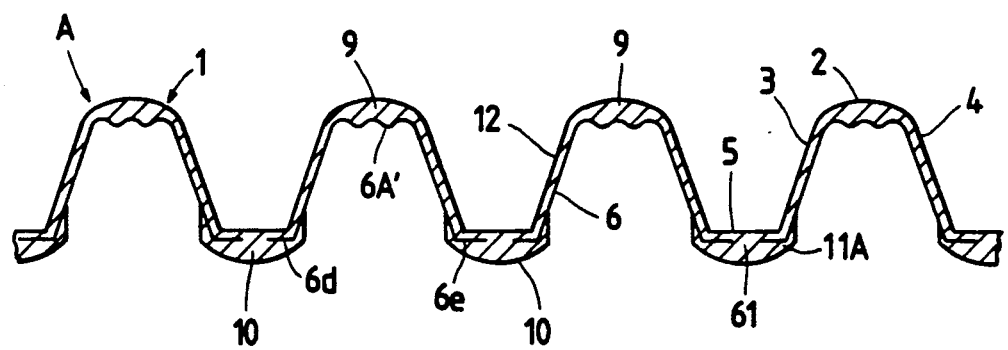

In an embodiment of the invention shown in FIG. 10, a metal belt plate 6 is of an inverted U-shaped cross-section. The base or bottom of the metal belt plate has a small corrugation to provide a plurality of ribs 6A'. The plurality of ribs 6A' are disposed at the top portion 2 of the pipe wall 1, and the opposite horizontal end or edge portions 6d and 6e are disposed in the bottom portion 5 and are spaced from each other. The entire outer peripheral surface of the pipe wall 1 is covered by a resin belt member 12, and the inner side of the bottom portion 5 as well as the inner sides of the lower end portions of the opposite side wall portions 3 and 4 is covered by a resin material 11A. With this arrangement, a connective portion 61 for the metal belt plate 6 is covered at its inner and outer surfaces only by the resin material, and the inner sides of the opposite wall portions 3 and 4 except for their lower ends, as well as the inner side of the top portion 2 are exposed at the surface of the pipe wall 1. In this embodiment, thickened resin covering portions 9 and 10 are formed respectively on the outer side of the top portion 2 and the inner side of the bottom portion 5.

Figure 11:
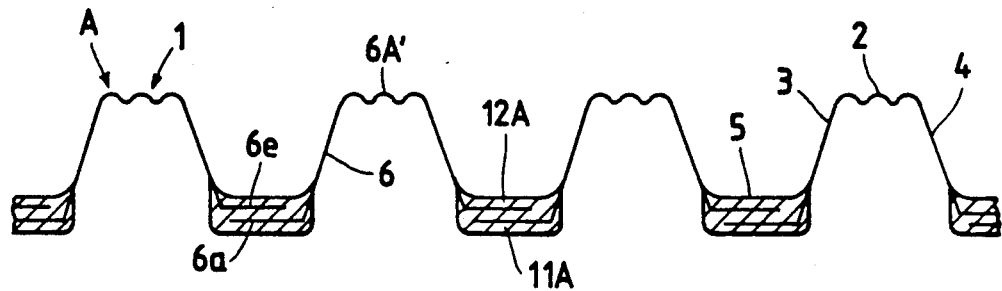

In an embodiment of the invention shown in FIG. 11, the metal belt plate 6 shown in FIG. 10 is so modified that the opposite horizontal end portions 6d and 6e are extended. The thus extended horizontal end portions 6d and 6e are disposed in overlapping relation to each other at the bottom portion 5 of the pipe wall 1, with the covering resin material interposed between the horizontal end portions 6d and 6e. The opposite sides of the thus overlapped portion of the bottom portion 5 as well as the opposite sides of the lower halves of the opposite side wall portions 3 and 4 adjacent to the bottom portion 5 are covered by covering resin materials 11A and 12A. The opposite sides of that portion of the metal belt plate 6 disposed at the top portion 2 as well as the opposite sides of the upper halves of the opposite side wall portions 3 and 4 remain bare.

The present invention can be embodied in this manner.

As to the material of the metal belt plate 6, instead of a thin stainless steel plate or a steel plate, an iron plate may be used. Also, a high-strength material of other metal may be used. When forming the above-mentioned perforations (punched holes), the shape, size and density of such perforations can be suitably determined.

As to the synthetic resin material forming the layers covering the metal belt plate as well as the connective portion, a polyolefin such as polyethylene, polypropylene or the like, and a vinyl chloride can be mainly used, but other synthetic resins may be used. Also, rubber or a rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieves the advantageous effects of the invention mentioned below.

As described above in detail with reference to the preferred embodiments, in the present invention, the wide thin metal belt plate is used as the strengthening member for forming the pipe wall. The metal belt plate is processed or deformed into a generally U-shaped cross-section or a generally inverted U-shaped cross-section, and is disposed in the top portion or the bottom portion of the helical corrugated construction and also in the opposite side wall portions extending therefrom. In the helical corrugated pipe construction having the metal belt plate as a pipe wall constituting element, one or more of reinforcement ribs are formed on that portion of the metal belt plate disposed at the top portion or the bottom portion of the pipe wall. With this construction, the helical corrugated pipe has a quite high pressure-resistant strength to withstand a flattening force at the top portion and/or the bottom portion of the pipe wall because of the provision of the metal belt plate. Therefore, even when the metal belt plate is covered with the synthetic resin material over the entire inner and outer peripheral surfaces thereof, such covering synthetic resin layers can be considerably reduced in thickness. This achieves such advantages as the reduction of the overall weight of the pipe, easier transport and handling of the pipe, and the amount of the synthetic resin to be used can be reduced still further than that conventionally used.

What is claimed is:

1. A pressure-resistant helical corrugated pipe, comprising:

a helical corrugated pipe wall formed of a top portion, opposite side wall portions extending from said top portion toward a central axis of the pipe, and a bottom portion disposed close to the central axis of the pipe;

a helically wound belt plate formed of a thin metal plate of a generally inverted U-shaped transverse cross-section, said belt plate being disposed at least in said top portion and also in at least a portion of said opposite side wall portions extending therefrom, and said belt plate serving as a constituent element of said pipe wall; and wherein only a portion of said metal belt plate disposed at said top portion has at least one reinforcement rib which is continuous in a circumferential direction, said at least one reinforcement rib protruding outwardly in a direction away from the central axis of the pipe and being corrugation-shaped; and further wherein an outer surface of said portion of said metal belt plate disposed at said top portion is covered with one of a synthetic resin material and a rubber material so as to follow along said at least one outwardly protruding reinforcement rib; and further comprising a connective portion provided between adjacent edges of said metal belt plate, said connective portion being integrally formed of one of a synthetic resin material and a rubber material.

2. The pressure-resistant helical corrugated pipe according to claim 1, wherein said at least one rib is formed at a generally central portion of said top portion of said pipe wall.

3. The pressure-resistant helical corrugated pipe according to claim 1, wherein a cylindrical inner wall is provided internally of said pipe wall, said cylindrical inner wall having an outer surface contacting said bottom portion of said pipe wall.

4. A pressure-resistant helical corrugated pipe according to claim 3, wherein said inner wall is reinforced by a reinforcement material selected from a group consisting of a fibrous material, a metal plate and a metal net.

5. A pressure-resistant helical corrugated pipe according to claim 1, wherein the entire of said belt plate is embedded in said helical corrugated pipe wall.

6. A pressure-resistant helical corrugated pipe according to claim 1, wherein said belt plate is made of a material selected from a group consisting of stainless steel, steel and iron.

7. A pressure-resistant helical corrugated pipe according to claim 1, wherein said synthetic resin is made of a material selected from a group consisting of a polyolefin and a vinyl chloride.

8. The pressure-resistant helical corrugated pipe according to claim 1, wherein said belt plate is disposed in the whole of said opposite side wall portions.

* * * * *